May 10, 1932.  A. G. IM OBERSTAG  1,857,473
AIRPLANE PROPELLER
Filed Nov. 20, 1929
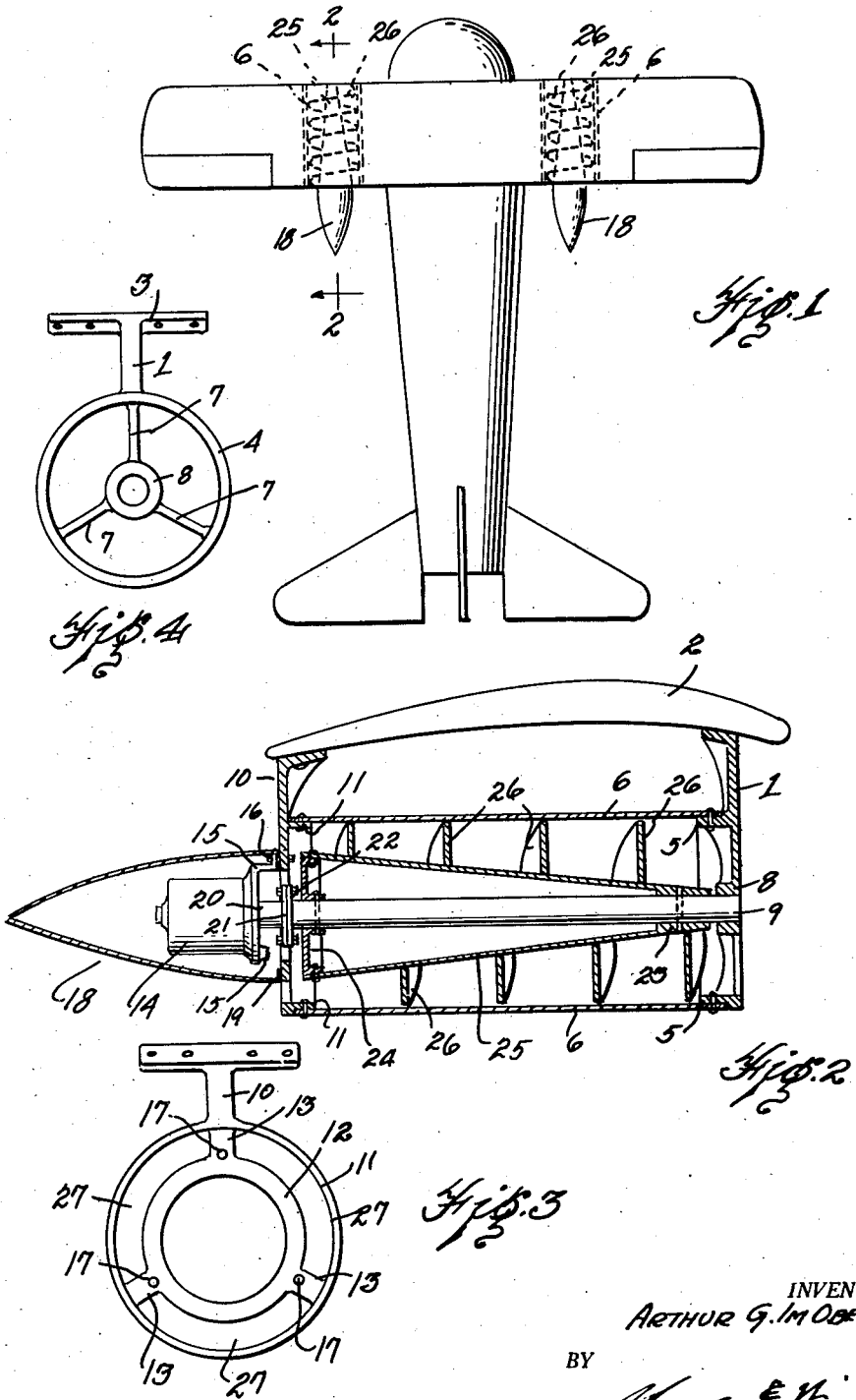
INVENTOR.
ARTHUR G. IM OBERSTAG.
BY
ATTORNEY.

Patented May 10, 1932

1,857,473

UNITED STATES PATENT OFFICE

ARTHUR G. IM OBERSTAG, OF DETROIT, MICHIGAN

AIRPLANE PROPELLER

Application filed November 20, 1929. Serial No. 408,427.

This invention relates to airplane propellers and the object of the invention is to provide a screw type air propeller mounted in a cylindrical casing and arranged to increase the velocity of the air as the air passes therethrough.

Another object of the invention is to provide an airplane propeller comprising a cylindrical casing in which a screw propeller is mounted, the screw propeller being provided with a conical base for increasing the velocity of the air and deflecting the air outwardly about an electric motor by which the propeller is driven.

A further object of the invention is to provide a means for confining the slip stream of the propeller and directing it away from the wing surfaces of the airplane.

A further object of the invention is to so streamline the driving motor as to reduce the head resistance and reduce the eddy currents as the air passes from the cylindrical casing.

Another object of the invention is to provide a streamline housing for the drive motor aligning with the conical air screw base and secured to the supporting bracket with the bolts that secure the drive motor to the bracket.

These objects and the several novel features of the invention are hereinafter more fully described and claimed and the preferred form of construction by which these objects are attained is shown in the accompanying drawings in which—

Fig. 1 is a plan view of an airplane equipped with my improved propellers.

Fig. 2 is an enlarged section taken on line 2—2 of Fig. 1.

Fig. 3 is an elevation of the rear supporting bracket.

Fig. 4 is a similar elevation of the forward supporting bracket.

The device comprises a bracket 1, shown in Figs. 2 and 4, which is secured to the under side of an airplane wing 2 by means of the base 3. The main portion 4 of the bracket 1 is circular in form and is provided with an annular flange 5 toward the rear as shown in Fig. 2, to which the cylindrical casing 6 is secured. Within the portion 4 of the bracket is a spider 7 supporting the forward bearing 8 for the propeller shaft 9, shown in Figs. 2 and 4. The rear bracket 10, shown in Figs. 2 and 3, is secured to the rear or trailing edge of the airplane wing 2 and is provided with a circular flange 11 to which the rear end of the circular casing 6 is secured. An annular motor base 12 is supported within the circular flange 11 by the three legs 13. An electric drive motor 14 is provided having three supporting legs 15 adapted to be secured to the legs 13 of the bracket 10 by bolts 16 extending through the apertures 17 in the legs 13.

A streamline housing 18 is provided for the electric motor 14 and at the forward end is provided with an inturned annular flange 19 extending between the legs 15 of the electric motor and the annular portion 12 of the bracket 10. This flange 19 is apertured to receive the bolts 16 and is secured between the electric motor base and the bracket 10.

The electric motor is provided with a shaft 20 having a flange 21 and the propeller shaft 9 is provided with a flange 22 which is bolted to the flange 21 of the motor shaft 20. By this arrangement the drive shaft is supported at one end in the electric motor housing and at the opposite end in the bearing 8 of the bracket 1.

A bracket 23 is secured to the forward end of the shaft 9 and a bracket 24 is secured to the rear end thereof. A sheet metal conical screw base 25 is secured to these two brackets as shown in Fig. 2, and an air screw 26 is secured to the conical base 25. At the rear end the conical base 25 extends in alignment with the outer surface of the streamline housing 18 so that the air flow through the casing 6 is continuous and uninterrupted.

In operation the electric motor drives the shaft 9 and the conical base 25 and air screw 26 secured thereto. This draws air inwardly through the spider 7 of the bracket 1 and due to the conical base 25 the air is compacted within the air screw so that it is discharged at a greater velocity through the openings 27 in the rear bracket 10.

This increased velocity upon impact with the air to the rear aids in sending the airplane forward and at the same time the streamline motor housing 18 prevents the formation of eddy currents which would tend to retard the airplane. With this device the slip stream of the propeller is confined within the cylindrical casing 6 and is thus kept away from the wing surfaces. Also the drive motor is so mounted that it has no head resistance and by means of the streamline housing 18 the reduced pressure areas are eliminated.

In flowing through the device the air stream is gradually reduced in volume and increased in velocity and is then suddenly released to atmosphere to urge the airplane forward.

The supporting brackets 1 and 10 are tied together by the cylindrical casing 6 so that the entire device is rigid and firmly secured to the airplane wing. The cylindrical casing 6 thus acts as a strut member between the brackets 1 and 10 and also confines the air stream to the screw propeller.

From the foregoing description it becomes evident that the device is very simple and efficient in operation, provides a complete drive unit for attachment to the airplane wing, and provides a device which accomplishes the objects described.

Having thus fully described my invention, its utility and mode of operation, what I claim and desire to secure by Letters Patent of the United States is:

1. In an airplane propeller, a forward and a rear bracket adapted to be secured to the forward and rear edge of an airplane wing respectively, a cylindrical casing secured to and connecting the brackets, a drive motor secured to the rear bracket and extending rearwardly therefrom, a streamline housing secured to the rear bracket and enclosing the drive motor, a shaft rotatably mounted in the forward bracket and secured to the drive motor shaft, a conical air screw base secured to the said shaft within the cylindrical housing, the conical base and streamline housing being of smaller diameter than the cylindrical casing, an air screw secured to the conical base and extending between the conical base and cylindrical casing, the forward and rear brackets being provided with air openings therethrough, the area of the air openings in the forward bracket being greater than the area of the air openings in the rear bracket.

2. In an airplane propeller, a forward and a rear bracket, a cylindrical casing secured to and connecting the brackets, a drive motor secured to the rear bracket in axial alignment with the cylindrical casing, a shaft rotatably mounted in the forward bracket and secured to the drive motor shaft, a streamline housing of smaller diameter than the cylindrical casing secured to the rear bracket in axial alignment with the cylindrical casing, the streamline housing forming a cover for the drive motor and the rear bracket being provided with air discharge openings between the said housing and the cylindrical casing, a conical air screw base secured to said shaft, the rear end of the conical base terminating adjacent the rear bracket in circumferential alignment with the streamline housing and an air screw fitting within the cylindrical housing and secured to the conical air screw base.

3. In an airplane propeller, a forward and a rear bracket adapted for attachment to an airplane wing, a cylindrical casing secured to and supported between the brackets, a drive motor secured to the rear bracket, a streamline housing for the drive motor secured to the rear bracket, a shaft secured to the motor shaft and rotatably mounted in the forward bracket, a conical air screw base secured to the said shaft, the rear end of the conical base being of substantially the same diameter as the forward end of the streamline motor housing and terminating adjacent thereto, and an air screw secured to the conical base and fitting within the cylindrical casing.

4. In an airplane propeller, a forward and a rear bracket adapted to be secured to the forward and rear edge of an airplane wing respectively, a cylindrical casing secured to and supported between the brackets, a drive motor secured to the rear bracket and extending rearwardly therefrom, a streamline housing secured to the rear bracket and enclosing the drive motor, a shaft rotatably mounted in the forward bracket and secured at the rear end to the drive motor shaft, a conical air screw base secured to the said shaft within the cylindrical casing and terminating adjacent the rear bracket, and an air screw secured to the conical base and extending between the conical base and the cylindrical casing.

5. In an airplane propeller, a forward and a rear bracket, a cylindrical casing secured to and connecting the brackets, a shaft rotatably mounted in the forward bracket and extending centrally of the casing, a conical air screw base secured to the shaft between the brackets, the conical base being of the greatest diameter adjacent the rear bracket, an air screw extending outwardly from the conical base toward the inner wall of the cylindrical casing, the external diameter of the air screw being uniform from one end of the casing to the other, the rear bracket being provided with air discharge apertures between the cylindrical casing and the conical base, and means for rotating the shaft.

6. In a propeller for airplanes, a pair of propeller structures supported by the wing of the plane on each side respectively of the fuselage, each propeller including a cylindrical casing, an air screw therein, the blade of which is in close association with the interior wall of the casing throughout the length of the screw, a conical base within the casing upon which the screw is mounted, said base having its small end toward the forward end of the casing, a drive motor at the rear of the casing, a stream line housing therefor of practically the same diameter as the adjacent larger end of the conical base for the air screw, and a drive motor in said housing.

In testimony whereof I sign this specification.

ARTHUR G. IM OBERSTAG.